US009552789B2

(12) United States Patent
Lee et al.

(10) Patent No.: US 9,552,789 B2
(45) Date of Patent: Jan. 24, 2017

(54) SCAN DRIVER AND DRIVING METHOD THEREOF

(71) Applicant: SAMSUNG DISPLAY CO., LTD., Yongin, Gyeonggi-Do (KR)

(72) Inventors: Hae-Yeon Lee, Bucheon-si (KR); Bo Yong Chung, Suwon-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 281 days.

(21) Appl. No.: 14/251,524

(22) Filed: Apr. 11, 2014

(65) Prior Publication Data

US 2015/0106646 A1 Apr. 16, 2015

(30) Foreign Application Priority Data

Oct. 15, 2013 (KR) ........................ 10-2013-0122825

(51) Int. Cl.

*G06F 1/04* (2006.01)
*G06F 1/10* (2006.01)
*G09G 5/00* (2006.01)
*G09G 3/36* (2006.01)

(52) U.S. Cl.

CPC .................................. *G09G 3/3677* (2013.01)

(58) Field of Classification Search

CPC ... G09G 3/3611; G09G 3/3674; G09G 3/3677
See application file for complete search history.

(56) References Cited

U.S. PATENT DOCUMENTS 5,376,829 A * 12/1994 Rogers ................. H03K 17/693 327/362
7,330,163 B2 * 2/2008 Nakai ................... G02F 1/1362 345/1.1
7,821,509 B2 * 10/2010 Choi .................... G09G 3/3266 327/333
8,941,629 B2 * 1/2015 Park ..................... G09G 3/3266 345/204
2006/0238134 A1 * 10/2006 Park ..................... G09G 3/3241 315/169.3
2008/0252565 A1 * 10/2008 Jeon ......................... G09G 3/22 345/74.1
2011/0187691 A1 * 8/2011 Chung ...................... G09G 5/00 345/211

FOREIGN PATENT DOCUMENTS

KR 10-2010-0128019 A 12/2010
KR 10-1065322 B1 9/2011
KR 10-1108172 B1 1/2012
KR 10-2013-0055258 A 5/2013

* cited by examiner

*Primary Examiner* — Mark Connolly
(74) *Attorney, Agent, or Firm* — Lewis Roca Rothgerber Christie LLP

(57) ABSTRACT

A scan driver includes a plurality of stages arranged sequentially and configured to respectively output a scan signal; and a switching unit configured to receive a plurality of clock signals, to select clock signals of the plurality of clock signals according to a selection control signal, and to input the selected clock signals to the plurality of stages.

20 Claims, 10 Drawing Sheets

FIG.7

| | Sequential driving | | Half driving | | IN |
|---|---|---|---|---|---|
| 410_1 | CLK1 | CLK3 | CLK1 | CLK3 | SSP_O |
| 410_2 | CLK2 | CLK4 | CLK1 | CLK3 | SSP_E |
| 410_3 | CLK3 | CLK1 | CLK2 | CLK4 | S(1) |
| 410_4 | CLK4 | CLK2 | CLK2 | CLK4 | S(2) |
| 410_5 | CLK1 | CLK3 | CLK3 | CLK1 | S(3) |
| 410_6 | CLK2 | CLK4 | CLK3 | CLK1 | S(4) |
| 410_7 | CLK3 | CLK1 | CLK4 | CLK2 | S(5) |
| 410_8 | CLK4 | CLK2 | CLK4 | CLK2 | S(6) |

SCAN DRIVER AND DRIVING METHOD THEREOF

CROSS-REFERENCE TO RELATED APPLICATION

This application claims priority to and the benefit of Korean Patent Application No. 10-2013-0122825 filed in the Korean Intellectual Property Office on Oct. 15, 2013, the entire contents of which are incorporated herein by reference.

BACKGROUND

1. Field

Embodiments of the present invention relate to a scan driver and a driving method thereof.

2. Description of the Related Art

A display device, such as a liquid crystal display (LCD) or an organic light emitting diode (OLED) display, generally includes a display panel having a plurality of pixels, a plurality of signal lines, and a driving unit, which drives the display panel. Each pixel may include a switching element, which is coupled to a signal line, a pixel electrode coupled thereto, and an opposed electrode. The pixel electrode is coupled to the switching element such as a thin film transistor (TFT) and the like, and receives a data voltage. The opposed electrode may be formed on an entire surface of the display panel, and a common voltage Vcom may be applied to the opposed electrode. The pixel electrode and the opposed electrode may be arranged on the same substrate or different substrates.

The display device receives an input image signal from an external graphics controller. The input image signal carries luminance information of each pixel, and each luminance has a number or value (e.g., a predetermined number or value). A data voltage corresponding to desired luminance information is applied to each pixel as a pixel voltage, depending on a difference from a common voltage, which is applied to the common electrode, and the pixel displays a luminance, which is indicated by a gray level of an image signal.

A driving unit includes a scan driver, which supplies a scan signal to a display panel, a data driver, which supplies a data signal to the display panel, and a signal controller, which controls the data driver, and the scan driver. The scan driver includes a shift register including a plurality of stages subordinately coupled to each other. The scan driver receives a plurality of driving voltages and a plurality of scan control signals to generate a scan signal. The plurality of driving voltages may include a gate-on voltage capable of turning on a switching element and a gate-off voltage capable of turning off the switching element. The plurality of scan control signals may include a scan start signal (SSP) for instructing start of scanning, a clock signal for controlling timing for outputting a gate-on pulse, and the like.

In the related art, driving circuits such as the scan driver and the data driver are mounted on a printed circuit board (PCB) as a chip to be coupled to the display panel, or a chip of the driving unit is directly mounted on the display panel. However, in recent years, because a scan driver does not require high mobility of a thin film transistor channel, a structure in which a scan driver is integrated into the display panel has been developed instead of forming a scan driver as a separate chip.

The above information disclosed in this Background section is only for enhancement of understanding of the background of the invention and therefore it may contain information that does not form the prior art that is already known in this country to a person of ordinary skill in the art.

SUMMARY

Aspects of example embodiments of the present invention include a scan driver and a driving method thereof which are flexibly applicable to various driving methods such as sequential driving, overlapping driving or half driving, and concurrent (e.g., simultaneous) driving.

According to an aspect of embodiments of the present invention, a scan driver includes: a plurality of stages arranged sequentially and configured to respectively output a scan signal; and a switching unit configured to receive a plurality of clock signals, to select clock signals of the plurality of clock signals according to a selection control signal, and to input the selected clock signals to the plurality of stages.

The switching unit may include first and second multiplexers coupled to a respective stage of the plurality of stages, wherein the first and second multiplexers are each configured to receive a first portion and a second portion, respectively, of the plurality of clock signals, to select a clock signal among the plurality of clock signals, and to output the selected clock signal to the respective stage.

The first portion of the clock signals and second portion of the clock signals may be different from each other.

The first and second multiplexers may each include a first control transistor and a second control transistor, output terminals of the first and second control transistors may be coupled to each other, a control terminal of the first control transistor may be configured to receive a first selection control signal, and a control terminal of the second control transistor may be configured to receive a second selection control signal.

Odd-numbered stages among the plurality of stages, except for a first stage, may be configured to receive a scan signal output from a second previous stage, and the first stage may be configured to receive a first scan start signal; and even-numbered stages among the plurality of stages, except for a second stage, may be configured to receive a scan signal outputted from a second previous stage, and the second stage may be configured to receive a second scan start signal.

The plurality of stages may include: a first clock terminal and a second clock terminal configured to receive the selected clock signal output from the first multiplexer; a third clock terminal configured to receive the clock signal output from the second multiplexer; an input terminal configured to receive any one among the first scan start signal, the second scan start signal, or the scan signal output from the second previous stage; a first global output control terminal and a second global output control terminal configured to receive a global output control signal; and an output terminal configured to output the scan signal.

The plurality of stages may include: a first transistor coupled between the first global output control terminal and the output terminal and comprising a gate coupled to a first node; a second transistor coupled between the third clock terminal and the output terminal and comprising a gate coupled to a second node; a third transistor coupled between the input terminal and the second node and comprising a gate coupled to the second clock terminal; a fourth transistor coupled between the first clock terminal and the first node and comprising a gate coupled to the first clock terminal; a fifth transistor coupled between the first clock terminal and the first node and comprising a gate coupled to the second node; at least one sixth transistor coupled between the second node and the output terminal; and a seventh transistor coupled between the second node and a power voltage terminal and comprising a gate coupled to the second global output control terminal.

The at least one sixth transistor may include a first sixth transistor and a second sixth transistor coupled in series, and a gate of the first sixth transistor may be coupled to the third clock terminal, and a gate of the second sixth transistor may be coupled to the first node.

A pulse of the first scan start signal may not be synchronized with a pulse of the second scan start signal, levels of the first selection control signal and the second selection control signal may be different from each other, and gate-on voltages from the plurality of stages may be sequentially output.

A pulse of the first scan start signal may be synchronized with a pulse of the second scan start signal, levels of the first selection control signal and the second selection control signal may be different from each other, and each neighboring two stages of the plurality of stages may form a group, the stages of each group may be configured to output gate-on voltages with a same timing, and the stages of the groups neighboring each other may be configured to sequentially output the gate-on voltages.

The first scan start signal and the second scan start signal may respectively maintain a constant voltage level, levels of the first selection control signal and the second selection control signal may be equal, and the plurality of stages may be configured to output the scan signal having a same waveform as a global output control signal.

According to an aspect of embodiments of the present invention, in a driving method of a scan driver, the scan driver including a plurality of stages, the driving method includes: providing a plurality of clock signals to a switching unit; selecting, by the switching unit, a first selected clock signal among the plurality of clock signals according to a selection control signal; providing the first selected clock signal to a respective stage of the plurality of stages; and outputting, by the respective stage, a scan signal in accordance with the first selected clock signal.

The switching unit may include first and second multiplexers coupled to the plurality of stages, and selecting the first selected clock signal may further include: providing a first portion of the plurality of clock signals to the first multiplexer and providing a second portion of the plurality of clock signals to the second multiplexer; selecting the first selected clock signal among the first portion of the plurality of clock signals; and providing the first selected clock signal to the respective stage.

The first portion of the plurality of clock signals provided to the first multiplexer and the second portion of the plurality of clock signals provided to the second multiplexer may be different from each other.

The first and second multiplexers may each include a first control transistor and a second control transistor, and selecting the first selected clock signal may further include: turning the first control transistor on or off according to a first selection control signal; and turning the second control transistor on or off according to a second selection control signal.

The method may further include: providing a scan signal from a second previous stage to odd-numbered stages, except for a first stage, among the plurality of stages, and providing a first scan start signal to the first stage; and providing a scan signal from a second previous stage to even numbered stages, except for a second stage, among the plurality of stages, and providing a second scan start signal to the second stage.

The plurality of stages may include: a first clock terminal and a second clock terminal configured to receive the first selected clock signal from the first multiplexer; a third clock terminal configured to receive a second selected clock signal from the second multiplexer; an input terminal configured to receive any one of the first scan start signal, the second scan start signal, or a scan signal outputted from the second previous stage; a first global output control terminal and a second global output control terminal configured to receive a global output control signal; and an output terminal configured to output the scan signal.

A pulse of the first scan start signal may not be synchronized with a pulse of the second scan start signal, levels of the first selection control signal and the second selection control signal may be different from each other, and gate-on voltages from the plurality of stages may be sequentially outputted.

A pulse of the first scan start signal may be synchronized with a pulse of the second scan start signal, levels of the first selection control signal and the second selection control signal may be different from each other, and each neighboring two stages of the plurality of stages may form a group, the stages of each group may output gate-on voltages with a same timing, and the stages of the groups neighboring each other may be configured to sequentially output the gate-on voltages.

The first scan start signal and the second scan start signal may respectively maintain a constant voltage level, levels of the first selection control signal and the second selection control signal may be equal, and the plurality of stages may be configured to output the scan signal having a same waveform as a global output control signal.

According to aspects of example embodiments of the present invention, an embedded scan driver and a driving method thereof flexibly applicable to various driving methods such as sequential driving, overlapping driving or half driving, and concurrent (e.g., simultaneous) driving are provided.

BRIEF DESCRIPTION OF THE DRAWINGS

FIG. 7 is a table showing a clock signal input to each stage of the scan driver according to the example embodiment of the present invention.

DETAILED DESCRIPTION

Aspects of the present invention will be described more fully hereinafter with reference to the accompanying drawings, in which example embodiments of the invention are shown.

As those skilled in the art would realize, the described embodiments may be modified in various different ways, all without departing from the spirit or scope of the present invention.

Throughout this specification and the claims that follow, when it is described that an element is "coupled" to another element, the element may be "directly coupled" to the other element or "electrically coupled" to the other element through a third element.

In addition, unless explicitly described to the contrary, the words "comprise", "include" and variations such as "comprises", "comprising", "includes", or "including" will be understood to imply the inclusion of stated elements but not the exclusion of any other elements.

Figure 1:
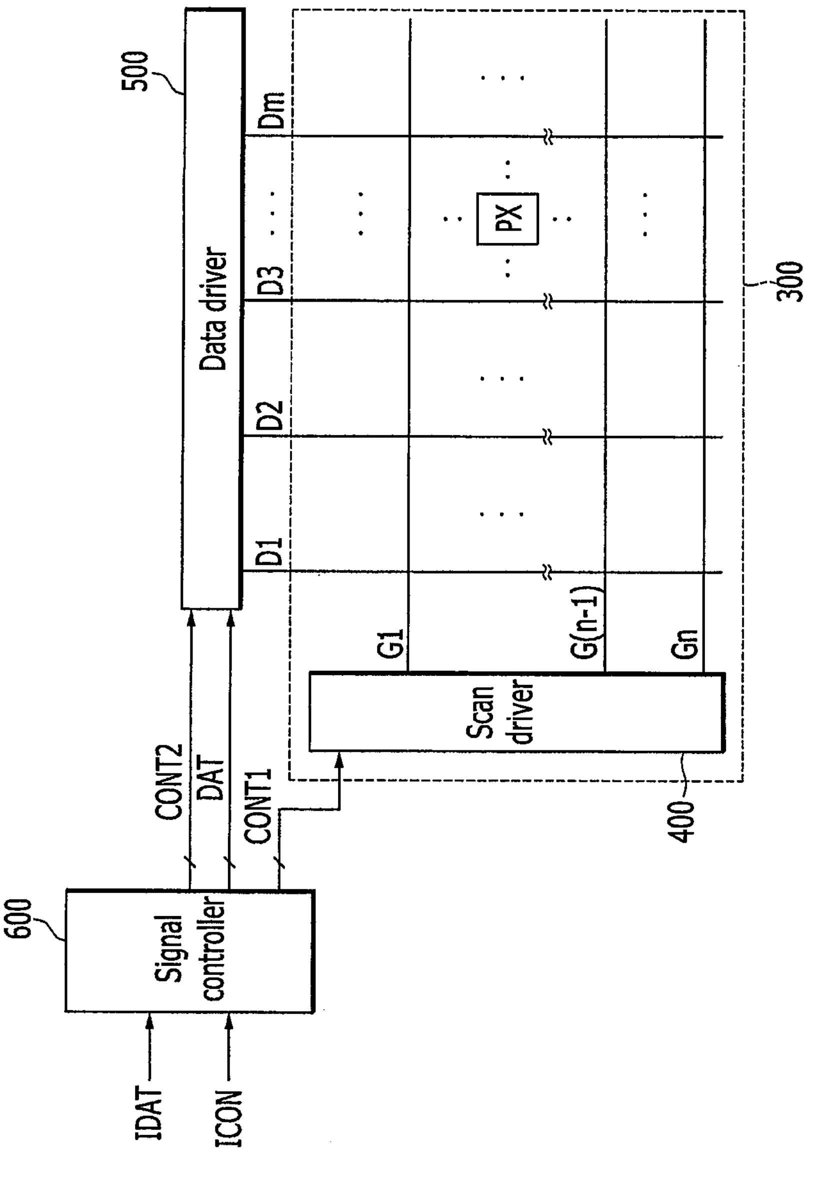
FIG. 1 is a block diagram of a display device according to an example embodiment of the present invention.

First, a display device according to an example embodiment of the present invention will be described with reference to FIG. 1. FIG. 1 is a block diagram of the display device according to an example embodiment of the present invention.

Referring to FIG. 1, the display device according to an example embodiment of the present invention includes a display panel 300, a scan driver 400, and a data driver 500, which are coupled to the display panel 300, and a signal controller 600, which controls the display panel 300 and the scan driver 400.

Referring to FIG. 1, the display panel 300 includes a plurality of signal lines, and a plurality of pixels PX, which are coupled to the signal lines and arranged in an approximate matrix form when viewed as an equivalent circuit. The signal lines include a plurality of scanning signal lines G1-Gn, which transmit a scan signal and a plurality of data lines D1-Dm, which transmit a data voltage. The scanning signal lines G1-Gn are in parallel (or substantially parallel) with each other, and may primarily extend in a row direction.

The data lines D1-Dm are in parallel (or substantially parallel) with each other, and may mainly extend in a column direction. One pixel PX may include at least one data line among the data lines D1-Dm, at least one switching element coupled to at least one scanning signal line among signal lines G1-Gn, and at least one pixel electrode coupled to the switching element. The switching element may include at least one thin film transistor, and may be controlled by scan signals, which the scanning signal lines G1-Gn transmit, and transmit data voltages, which the data lines transmit to the pixel electrode.

Each pixel (PX) may display one of the primary colors (spatial division) or alternately display multiple primary colors over time (temporal division) in order to embody color display, thereby enabling a desired color to be recognized as a spatial or temporal summation of these primary colors. Examples of primary colors may be three primary colors such as red, green, and blue, three primary colors such as yellow, cyan, and magenta, or four primary colors.

The signal controller 600 receives an input image signal (IDAT) and an input control signal (ICON) from a graphics controller (not shown) to control the operation of the scan driver 400 and the data driver 500. The input image signal (IDAT) contains luminance information of each pixel (PX). The luminance has a number (e.g., a predetermined number), for example, $1024=2^{10}$, $256=2^{8}$, or $64=2^{6}$ of gray level values. The input image signal (IDAT) may be present for each primary color represented by a pixel (PX). Examples of the input control signal (ICON) may include a vertical synchronization signal, a horizontal synchronizing signal, a main clock signal, a data enable signal, and the like.

The signal controller 600 converts the input image signal (IDAT) into an output image signal (DAT) by processing the input image signal (IDAT) based on the input image signal (IDAT) and the input control signal (ICON), and generates a scan control signal (CONT1), a data control signal (CONT2), and the like.

The data driver 500 is coupled to data lines (D1-Dm), selects a gray level voltage based on the output image signal (DAT) received from the signal controller 600, and applies the gray level voltage to the data lines (D1-Dm) as a data voltage (Vd). The data driver 500 may also receive a gray level voltage generated by a separate gray level voltage generator (not shown), and may also be provided with only a limited number of reference gray level voltages and thereby generate a gray level voltage with respect to all gray level values.

The scan driver 400 is coupled to the scanning lines G1-Gn, and applies scan signals, including the high voltage Von and the low voltage Voff, to the scanning signal lines G1-Gn.

Each of the driving devices may be directly mounted on the display panel 300 as at least one IC chip, mounted on a flexible printed circuit film (not shown) to be attached onto the display panel 300 as a tape carrier package (TCP), or mounted on a separate printed circuit board (PCB) (not shown).

Alternatively, the driving devices may be integrated with the display panel 300 together with the signal lines G1-Gn and D1-Dm and the thin film transistors. For example, the scan driver 400 may be integrated with the display panel 300, and may be formed by the same process as for the thin film transistor of the pixel PX.

Now, aspects of the operation of the display device will be described. The signal controller 600 receives the input image signal IDAT and the input control signal ICON for controlling a display of the input image signal IDAT from the external graphics controller (not shown). The signal controller 600 appropriately processes the input image signal IDAT based on the input image signal IDAT and the input control signal ICON in accordance with an operation condition of the display panel 300, and generates the scan control signal CONT1 and the data control signal CONT2.

The scan control signal CONT1 includes the scan start signal SSP for instructing a scan start, a plurality of clock signals CLK, a global output control signal GCK, and first and second selection control signals CON_NR and CON_HG. The scan start signal SSP is a signal to generate a first scan signal for displaying an image of one frame. The clock signal CLK is a synchronization signal to sequentially apply the scan signal to the plurality of scan signal lines G1-Gn. The global output control signal GCK is a signal, which controls the scan signal to be uniformly applied to the plurality of the scan signal lines G1-Gn. The first and second selection control signals CON_NR and CON_HG will be described in some detail later.

The data control signal CONT2 includes a horizontal synchronization start signal STH notifying transmission start of the output image signal DAT for pixels PX in a row, a load signal TP instructing the data voltage to be applied to the data lines D1-Dm, and a data clock signal HCLK. The signal controller 600 outputs the scan control signal CONT1 to the gate driver 400, and outputs the data control signal CONT2 and the processed output image signal DAT to the data driver 500.

The data driver 500 receives the output image signal DAT for pixels PX in a row according to the data control signal CONT2 from the signal controller 600, and selects a gray level voltage corresponding to each of the output image signals DAT such that it converts the digital output image signal DAT into a data voltage, which is an analog data signal, and then applies the data voltage to the data lines D1-Dm.

The scan driver 400 receives the scan control signal CONT1 from the signal controller 600 and generates the scan signal, which consists of the gate-on voltage Von and the gate-off voltage Voff. The scan driver 400 sequentially applies the gate-on voltage Von to the scan signal lines G1-Gn and turns on the switching element coupled to the scan signal lines G1-Gn. Accordingly, the data voltage applied to the data lines D1 to Dm is applied to the corresponding pixel PX through the turned-on switching element Q.

A difference between the data voltage applied to the pixel PX and the common voltage is represented as a pixel voltage of the corresponding pixel PX, and a luminance of the image may be represented in accordance with the pixel voltage. The procedures described above are repeated in the unit of one horizontal period 1H such that the data voltage is applied to all pixels PX by sequentially applying the gate-on voltage Von to all the scan signal lines G1 to Gn, thereby displaying an image for one, frame.

Figure 2:
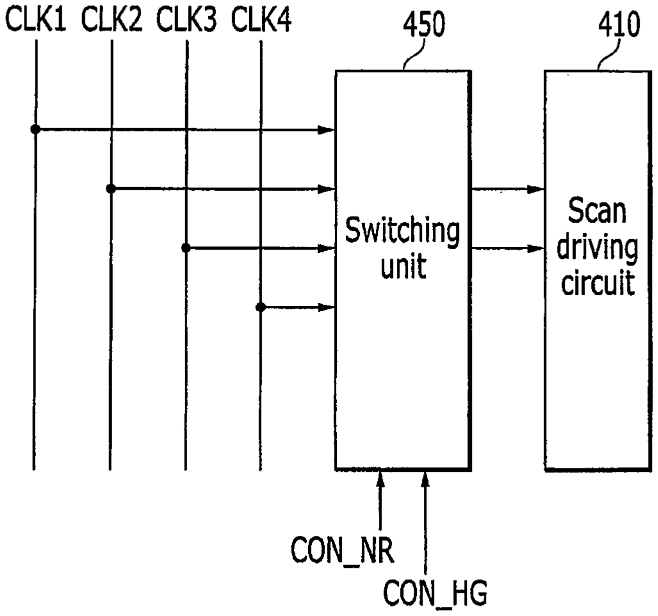
FIG. 2 is a block diagram of a scan driver according to the example embodiment of the present invention.
Figure 3:
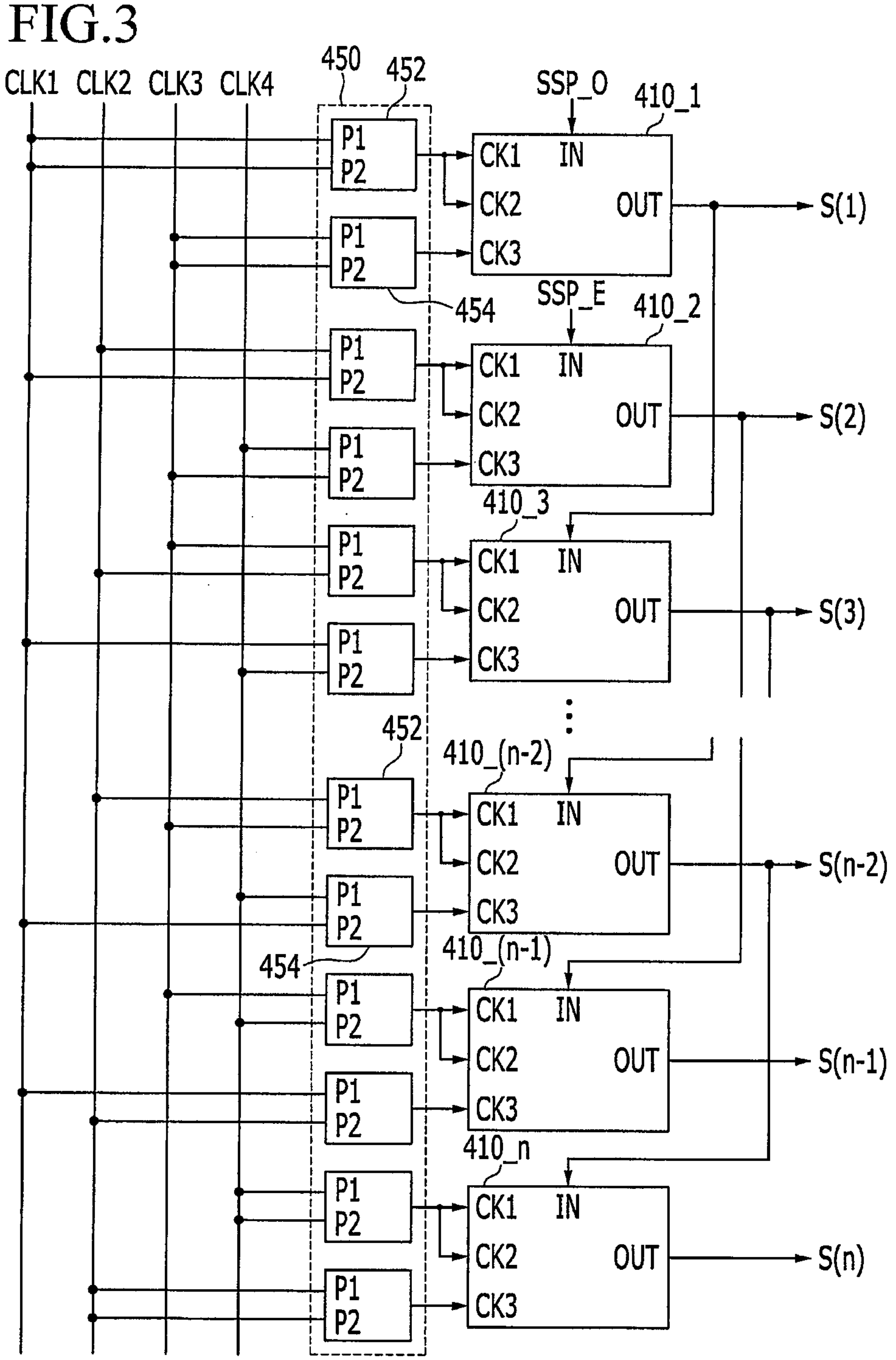
FIG. 3 is a block diagram of the scan driver according to the example embodiment of the present invention.
Figure 4:
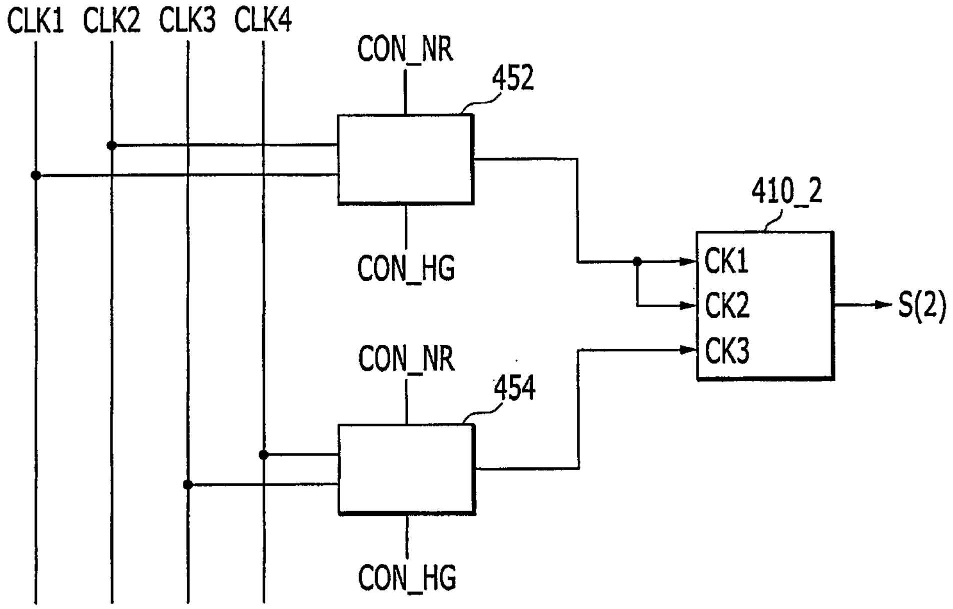
FIG. 4 is a block diagram of a part of the scan driver according to the example embodiment of the present invention.
Figure 5:
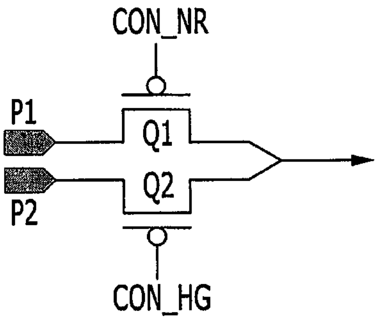
FIG. 5 is a circuit diagram of a multiplexer of a switching unit according to the example embodiment of the present invention.

Now, referring to FIGS. 2 to 5, the scan driver 400 according to an example embodiment of the present invention will be described in detail. FIG. 2 and FIG. 3 are block diagrams of a scan driver according to an example embodiment of the present invention, FIG. 4 is a block diagram of a part of the scan driver according to an example embodiment of the present invention, and FIG. 5 is a circuit diagram of a multiplexer of a switching unit according to an example embodiment of the present invention.

Referring to FIG. 2, the scan driver 400 according to an example embodiment of the present invention includes a scan driving circuit 410 and a switching unit 450. The switching unit 450 receives a plurality of clock signals CLK1, CLK2, CLK3, and CLK4 and the first and second selection control signals CON_NR and CON_HG, selects clock signals from among the plurality of clock signals CLK1, CLK2, CLK3, and CLK4 in accordance with the first and second selection control signals CON_NR and CON_HG, and transmits the selected control signal to the scan driving circuit 410.

The first and second selection control signals CON_NR and CON_HG may be differently set in accordance with a driving method of the scan driver 400. The plurality of clock signals CLK1, CLK2, CLK3, and CLK4 include a first clock signal CLK1, a second clock signal CLK2, a third clock signal CLK3, and a fourth clock signal CLK, which are different from each other.

That is, phases of the first, second, third, and fourth clock signals CLK1, CLK2, CLK3, and CLK4 may be different from each other. The scan driving circuit 410 sequentially applies the gate-on voltage Von to the scan signal lines G1-Gn in accordance with the clock signals CLK1, CLK2, CLK3, and CLK4, which the switching unit selects to output.

Referring to FIG. 3, the switching unit 450 includes a plurality of pairs of the first and second multiplexers 452 and 454. The first and second multiplexers 452 and 454 each receive two clock signals through two input terminals P1 and P2 among the plurality of clock signals CLK1, CLK2, CLK3, and CLK4, and output one clock signal by selecting one among the two clock signals. The clock signals input to the first and second multiplexers 452 and 453 may be different from each other, and may be the same clock signal as or different from each other.

Referring to FIG. 4, the first and second multiplexers forming the switching unit 450 respectively select clock signals among the plurality of clock signals CLK1, CLK2, CLK3, and CLK4 in accordance with the control of the first and second selection control signals CON_NR and CON_HG.

Referring to FIG. 5, the first and second multiplexers 452 and 454 according to an example embodiment of the present invention respectively includes a pair of first and second control transistors Q1 and Q2. Respective input terminals P1 and P2 of the first and second control transistors receive one clock signal among the plurality of clock signals CLK1, CLK2, CLK3, and CLK4, and output terminals of the first and second control transistors Q1 and Q2 are coupled with each other to output one clock signal.

Control terminals of the first and second control transistors Q1 and Q2 receive the first and second control signals CON_NR and CON_HG, which are different from each other. That is, the first selection control signal CON_NR may be input to the control terminal of the first control transistor Q1, and the second selection control signal CON_HG may be input to the control terminal of the second control transistor Q2.

The first and second control transistors Q1 and Q2 according to the example embodiment of the present invention may be p-channel field effect transistors. In this instance, the first control transistor Q1 may be turned on when the first selection control signal CON_NR is at a low level, and may be turned off when the first selection control signal CON_NR is at a high level, while the second control transistor Q2 may be turned on when the second selection control signal CON_HG is at a low level, and may be turned off when the second selection control signal CON_HG is at a high level.

Alternatively, the first and second control transistors Q1 and Q2 may be n-channel field effect transistors, and in this instance, the first control transistor Q1 may be turned on when the first selection control signal CON_NR is at a high level, and may be turned off when the first selection control signal CON_NR is at a low level, while the second control transistor Q2 may be turned on when the second selection control signal CON_HG is at a high level, and may be turned off when the second selection control signal CON_HG is at a low level.

Referring to FIG. 3 again, the scan driving circuits 410 are arranged in a row, and may be shift registers including a plurality of stages 410_1, 410_2, . . . , **410_*n*, which are respectively coupled to the scan signal lines G1-Gn. The stages 410_1, 410_2, . . . , 410_*n*** are sequentially coupled to the scan signal lines G1-Gn, and respectively transmit scan signals S(1), s(2), . . . , S(n) to the scan signal lines G1-Gn.

Each of the stages 410_1, 410_2, . . . , **410_*n* includes a first clock terminal CK1, a second clock terminal CK2, a third clock terminal CK3, an input terminal IN, and an output terminal OUT. The first and second clock terminals CK1 and CK2 of the stages 410_1, 410_2, . . . , 410_*n* receive the clock signal selected by the first multiplexer 452, and the third clock terminal CK3 receives the clock signal selected by second multiplexer 454**.

In the present example embodiment, the first and second clock terminals CK1 and CK2 may receive the same clock signal. For example, referring to FIG. 4, the second stage 410_2 will be described. The first multiplexer 452 coupled to the second stage 410_2 receives the first and second clock signals CLK1 and CLK2, and outputs one clock signal to the first and second clock terminals CK1 and CK2 of the second stage 410_2 by selecting one among them. The second multiplexer 454 coupled to the second stage 410_2 receives the third and fourth clock signals CLK3 and CLK4, and outputs one clock signal to the third clock terminal CK3 of the second stage 410_2 by selecting one among them.

The output terminals OUT of the stages 410_1, 410_1, 410_2, . . . , **410_*n* respectively output the scan signals S(1), S(2), . . . , S(n), and the input terminal IN receives the scanning signals outputted from the output terminal OUT of the second previous stage. For example, the input terminal IN of the j-th stage 410_*j* receives the scanning signal S(j−2) outputted from the output terminal OUT of j−2-th stage 410_*j*−2, which is the second previous stage. However, the input terminal IN of the first stage 410_1 receives the first scan start signal SSP_O, and the input terminal IN of the first stage 410_2** receives the second scan start signal SSP_E.

Figure 6:
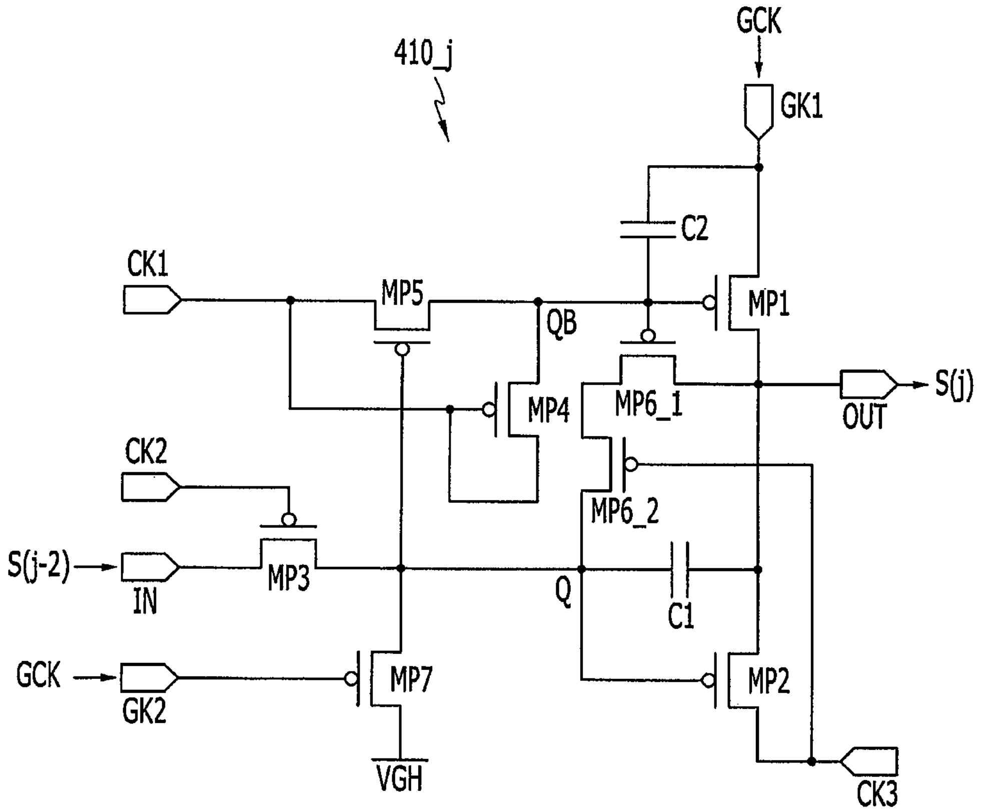
FIG. 6 is an example showing a circuit diagram of one stage of the scan driver according to the example embodiment of the present invention.

Now, referring to FIG. 6, one stage of the scan driver 400 according to an example embodiment of the present invention will be described. FIG. 6 is an example showing a circuit diagram showing one stage of the scan driver according to an example embodiment of the present invention.

Referring to FIG. 6, in each stage of the scan driver 400 according to an example embodiment of the present invention, as an example, the j-th stage **410_*j* includes the first clock terminal CK1, the second clock terminal CK2, the third clock terminal CK, the input terminal IN, the output terminal OUT, the plurality of terminals such as the first and second global output control terminals GK1 and GK2, the plurality of transistors MP1, MP2, MP3, MP4, MP5, MP6_1, MP6_2, and MP7, and the plurality of capacitors C1 and C2**.

As described above, the first and second clock terminals CK1 and CK2 receive the clock signal selected by the first multiplexer 452, and the third clock terminal CK3 receives the clock signal selected by the second multiplexer 454. The output terminal OUT outputs the scan signal S(j), and the input terminal IN receives the scan signal S(j−2) outputted from the output terminal OUT of the second previous stage **410_*j***−2 or the scan start signals SSP_O and SSP_E.

The first and second global output control terminals GK1 and GK2 receive the global output control signal GCK. The first transistor MP1 is coupled between the first global output control terminal GK1 and the output terminal OUT, and the gate is coupled to the first node QB. The second transistor MP2 is coupled between the first clock terminal CK3 and the output terminal OUT, and the gate is coupled to the second node Q. The third transistor MP3 is coupled between the input terminal IN and the second node Q, and the gate is coupled to the second clock terminal CK2. The fourth transistor MP4 is coupled between the first clock terminal CK1 and the first node QB, and the gate, together with the drain, is coupled to the first clock terminal CK1. The fifth transistor MP5 is coupled between the first clock terminal CK1 and the first node QB, and the gate is coupled to the second node Q.

Two sixth transistors MP6_1 and MP6_2 are coupled in series between the second node Q and the output terminal OUT. The gate of the sixth transistor MP6_1 is coupled to the first node QB, and the gate of the sixth transistor MP6_2 is coupled to the third clock terminal CK3. The seventh transistor MP7 is coupled between the second node Q and the power voltage terminal VGH, and the gate is coupled to the second global output control terminal GK2. The first capacitor C1 is coupled between the second node Q and the output terminal OUT, and the second capacitor C2 is coupled between the first global output control terminal GK1 and the first node QB.

The transistors MP1, MP2, MP3, MP4, MP5, MP6_1, MP6_2, and MP7 may be p-channel field effect transistors (FETs). In this instance, the gate-on voltage for turning on the transistors MP1, MP2, MP3, MP4, MP5, MP6_1, MP6_2, and MP7 may be a low level voltage, and the gate-off voltage for turning off the transistors MP1, MP2, MP3, MP4, MP5, MP6_1, MP6_2, and MP7 may be a high level voltage.

The transistors MP1, MP2, MP3, MP4, MP5, MP6_1, MP6_2, and MP7 are not limited to a p-channel type, and may alternatively be an n-channel type, and in this instance, the levels of the gate-on and gate-off voltages may be varied (e.g., alternated with respect to the gate-on and gate-off voltages described above for the p-channel FETs).

Now, together with the drawings described above, various driving methods of the scan driver according to the example embodiment of the present invention will be described with references to FIGS. 7 to 10.

Figure 8:
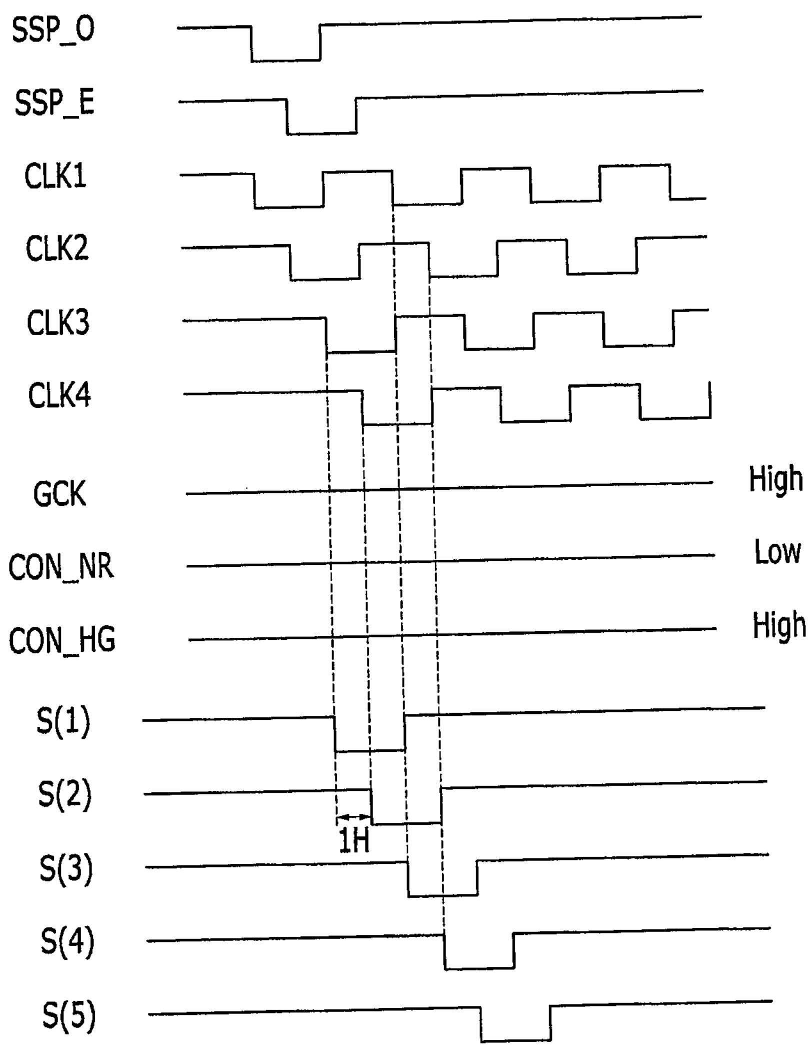
FIG. 8 is a timing diagram showing a driving signal and an output signal of the scan driver according to the example embodiment of the present invention.
Figure 9:
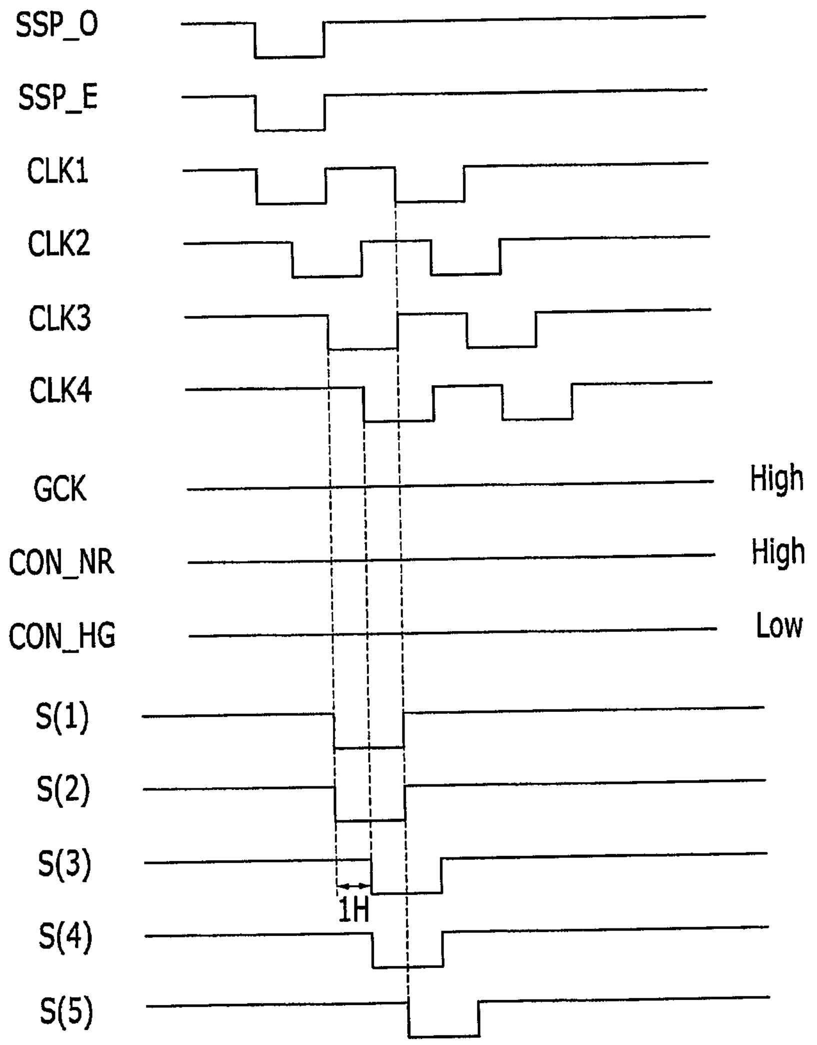
FIG. 9 is a timing diagram showing the driving signal and the output signal of the scan driver according to the example embodiment of the present invention.
Figure 10:
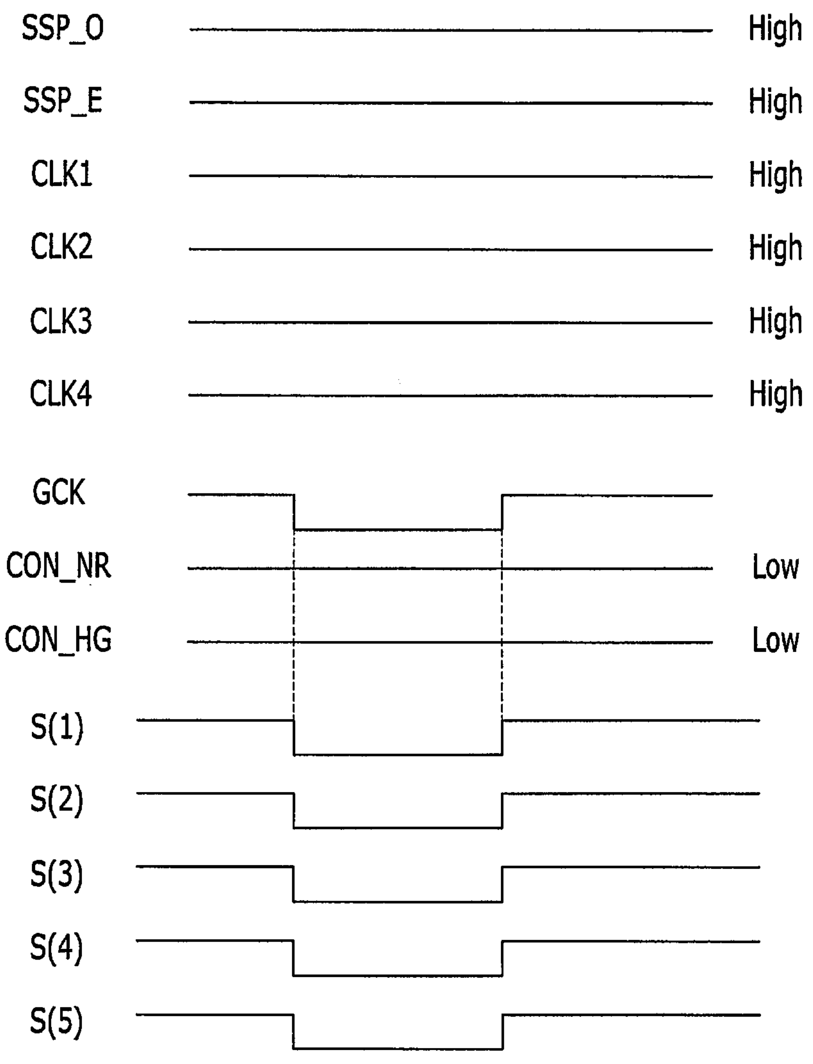
FIG. 10 is a timing diagram showing the driving signal and the output signal of the scan driver according to the example embodiment of the present invention.

FIG. 7 is a table showing a clock signal input to each stage of the scan driver according to an example embodiment of the present invention, FIG. 8 is a timing diagram showing a driving signal and an output signal of the scan driver according to an example embodiment of the present invention, FIG. 9 is a timing diagram showing the driving signal and the output signal of the scan driver according to an example embodiment of the present invention, and FIG. 10 is a timing diagram showing the driving signal and the output signal of the scan driver according to an example embodiment of the present invention.

Referring to FIG. 7, depending on driving methods, the scan driver according to an example embodiment of the present invention receives different clock signals among the first to third clock terminals CK1, CK2 and CK3 such that they are controlled by the first and second selection control signals CON_NR and CON_HG which the switching unit 450 receives.

For example, sequential driving, half driving, and concurrent (e.g., simultaneous) driving will be described in the present embodiment. The sequential driving is a driving method in which different data voltages are applied for every row of the display panel by sequentially applying the gate-on voltage to the scan signal lines G1-Gn, and the neighboring scan signals may overlap each other.

The half driving is a driving method in which two or more of the scan signal lines G1-Gn are grouped to be sequentially driven by the same group unit while being concurrently (e.g., simultaneously) driven. The half driving has a characteristic in embodying a high resolution display panel as a charging time of each row may be increased.

The concurrent (e.g., simultaneous) driving is a driving method in which all the scan signal lines G1-Gn are concurrently (e.g., simultaneously) driven, and may be used to initialize a pixel PX circuit and to inspect a lighting abnormality.

First, the sequential driving method of the scan driver according to an example embodiment of the present invention will be described with reference to FIG. 8 together with FIG. 7. Referring to FIG. 8, a pulse of a scan start signal SSP_O instructing a scan start of odd-numbered stages 410_1, 410_3, . . . is not synchronized with a pulse of a scan start signal SSP_E instructing a scan start of even-numbered stages 410_2, 410_4, . . . such that they may not overlap each other or may partially overlap each other.

The interval between the pulse of the scan start signal SSP_O and the pulse of the scan start signal SSP_E may be about 1 horizontal period (1H). The plurality of clock signals CLK1, CLK2, CLK3, and CLK4 are sequentially delayed in phases, and the pulses of the clock signals CLK1, CLK2, CLK3, and CLK4 may partially overlap each other. For example, the phase difference between the clock signals CLK1, CLK2, CLK3, and CLK4 may be about 90 degrees and their duty ratio may be about 50%.

The third clock signal CLK3 may be an inverted signal of the first clock signal CLK1, and the fourth clock signal CLK4 may be an inverted signal of the second clock signal CLK2. The phase difference between the clock signals CLK1, CLK2, CLK3, and CLK4 may correspond to 1 horizontal period (1H). The global output control signal GCK is output as a high-level voltage while being driven by the sequential driving method.

While being driven by the sequential driving method, the first selection control signal CON_NR input to the switching unit 450 is output as a low-level voltage and the second selection control signal CON_HG is output as a high-level voltage.

Accordingly, the first control transistor Q1 of the first and second multiplexers 452 and 454 illustrated in FIG. 5 is turned on and the second control transistor Q2 is turned off such that the clock signal input to the input terminal P1 of the first control transistor Q1 is input to the clock terminals CK1, CK2, and CK3 of the respective stages 410_1, 410_2, . . . , 410_*n*.

In some detail, referring to FIG. 3 and FIG. 7, the first clock signal CLK1 is input to the first and second clock terminals CK1 and CK2 of the first stage 410_1, and the third clock signal CLK3 is input to the third clock terminal CK3. The second clock signal CLK2 is input to the first and second clock terminals CK1 and CK2 of the second stage 410_2, and the fourth clock signal CLK4 is input to the third clock terminal CK3.

The third clock signal CLK3 is input to the first and second clock terminals CK1 and CK2 of the third stage 410_3, and the first clock signal CLK1 is input to the third clock terminal CK3. The fourth clock signal CLK4 is input to the first and second clock terminals CK1 and CK2 of the fourth stage 410_4, and the second clock signal CLK2 is input to the third clock terminal CK3.

Hereinafter, some of the details of the same process described above may be repeated. The scan signals S(1), S(2), . . . , S(n) output from the respective stages 410_1, 410_2, . . . , 410_*n* are shown in FIG. 8 in accordance with the clock signals CLK1, CLK2, CLK3, and CLK4 that are selectively input.

That is, the first scan signal line G1 outputs the gate-on voltage synchronized with the third clock signal CLK3, the second scan signal line G2 outputs the gate-on voltage synchronized with the fourth clock signal CLK4, the third scan signal line G3 outputs the gate-on voltage synchronized with the first clock signal CLK1, the fourth scan signal line G4 outputs the gate-on voltage synchronized with the second clock signal CLK2, and then the same process described above is repeated.

The gate-on voltage pulses of the scan signal lines G1-Gn partially overlap each other to be driven by the overlapping driving method, and the sequential driving is performed (e.g., entirely performed) by sequentially outputting the gate-on voltages to the scan signal lines G1-Gn. The pulse interval of the neighboring scan signals S(1), S(2), . . . , S(n) may be about 1 horizontal period (1H).

Next, the half-driving method by the scan driver according to an example embodiment of the present invention will be described with reference to FIG. 9 together with FIG. 7. Referring to FIG. 9, the scan start signal SSP_O instructing a scan start of the odd-numbered stages 410_1, 410_3, . . . is the same as the scan start signal SSP_E instructing a scan start of the even-numbered stages 410_2, 410_4, . . . .

The phases of the plurality of clock signals CLK1, CLK2, CLK3, and CLK4 are sequentially delayed, and the pulses of the clock signals CLK1, CLK2, CLK3, and CLK4 may partially overlap each other. For example, a phase difference of the clock signals CLK1, CLK2, CLK3, and CLK4 may be about 90 degrees, and a duty ratio of the respective clock signal may be about 50%.

The third clock signal CLK3 may be an inverted signal of the first clock signal CLK, and the fourth clock signal CLK4 may be an inverted signal of the second clock signal CLK2. The phase difference of the clock signals CLK1, CLK2, CLK3, and CLK4 may correspond to 1 horizontal period (1H). The global output control signal GCK is output as a high-level voltage while being driven by the half driving method.

While being driven by the half-driving method, the first selection control signal CON_NR input to the switching unit 450 is output as a high-level voltage and the second selection control signal CON_HG is output as a low-level voltage. Accordingly, as shown in FIG. 5, the second control transistor Q2 of the first and second multiplexers 452 and 454 is turned on and the first control transistor Q1 is turned off such that the clock signal input to the input terminal P2 of the second control transistor Q2 is input to the clock terminals CK1, CK2, and CK3 of the respective stages 410_1, 410_2, . . . , 410_*n*.

In some detail, referring to FIG. 3 and FIG. 7, the first clock signal CLK1 is input to the first and second clock terminals CK1 and CK2 of the first and second stages 410_1 and 410_2, and the third clock signal CLK3 is input to the third clock terminal CK3. The second clock signal CLK2 is input to the first and second clock terminals CK1 and CK2 of the third and fourth stages 410_3 and 410_4, and the fourth clock signal CLK4 is input to the third clock terminal CK3. The third clock signal CLK3 is input to the first and second clock terminals CK1 and CK2 of the fifth and sixth stages 410_5 and 410_6, and the first clock signal CLK1 is input to the third clock terminal CK3. The fourth clock signal CLK4 is input to the first and second clock terminals CK1 and CK2 of the seventh and eighth stages 410_7 and 410_8, and the second clock signal CLK2 is input to the third clock terminal CK3.

Hereinafter, some of the details of the same process described above may be repeated, and two stages are paired to receive the same clock signal. The scan signals S(1), S(2), . . . , S(n) outputted from the respective stages 410_1, 410_2, . . . , 410_*n* in accordance with the clock signals CLK1, CLK2, CLK3, and CLK4 selectively input are illustrated in FIG. 9.

That is, the first and second scan signal lines G1 and G2 output the gate-on voltage synchronized with the third clock signal CLK3, the third and fourth scan signal lines G3 and G4 output the gate-on voltage synchronized with the fourth clock signal CLK4, the fifth and sixth scan signal lines G5 and G6 output the gate-on voltage synchronized with the first clock signal CLK1, the seventh and eighth scan signal lines G7 and G8 output the gate-on voltage synchronized with the second clock signal CLK2, and the same process described above are repeated thereinafter.

That is, the plurality of stages 410_1, 410_2, . . . , **410_*n* are paired to form a group, the stage of the same group outputs the gate-on voltage with the same timing, and the stages 410_1, 410_2, . . . , 410_*n* of the groups neighboring each other sequentially output the gate-on voltage to the scan signal lines G1-Gn. The gate-on voltage pulses outputted from the stages 410_1, 410_2, . . . , 410_*n*** of the groups neighboring each other may partially overlap, and the overlapping driving method or sequential driving method is performed by the group unit. The pulse interval of the scan signal S(1), S(2), . . . , S(n) applied to the signal lines G1-Gn of the groups neighboring each other may be about 1 horizontal period (1H).

Next, the concurrent (e.g., simultaneous) driving method of the scan driver according to an example embodiment of the present invention will be described with reference to FIG. 10 together with FIG. 7. Referring to FIG. 10, the pulse of a scan start signal SSP_O instructing a scan start of the odd-numbered stages 410_1, 410_3, . . . and the pulse of a scan start signal SSPE instructing a scan start of the even-numbered stages 410_2, 410_4, . . . respectively maintain a high-level voltage.

While being driven by a concurrent (e.g., simultaneous) driving method, the plurality of clock signals CLK1, CLK2, CLK3, and CLK4 are uniformly output as a high-level voltage. The global output control signal GCK may be output as a high or low level voltage at least for a predetermined period, or may swing between a high voltage level and a low voltage level. While being driven by the concurrent (e.g., simultaneous) driving method, the first and second selection control signals CON_NR and CON_HG input to the switching unit 450 are respectively output as a low-level voltage.

Accordingly, the first and second control transistors Q1 and Q2 of the first and second multiplexers 452 and 454, illustrated in FIG. 5, are turned on such that the two clock signals input to the input terminals P1 and P2 of the first and second control transistors Q1 and Q2 are input to the clock terminals CK1, CK2, and CK3 of the respective stages 410_1, 410_2, . . . , **410_*n***.

Each of the clock signals CLK1, CLK2, CLK3, and CLK4 maintains a high-level voltage such that a high-level voltage is applied to the first to third clock terminals CK1, CK2, and CK3 of the respective stages 410_1, 410_2, . . . , **410_*n*. Accordingly, the scan signals S(1), S(2), . . . . S(n) outputted from the respective stages 410_1, 410_2, . . . , 410_*n* uniformly have the same waveform as the global output control signal GCK, as shown in FIG. 10**.

According to an example embodiment of the present invention, the scan driver 400 including the switching unit 450 may be flexibly applicable to the various scan driving methods such as the sequential driving, the half driving, and the concurrent (e.g., simultaneous) driving and various pixel circuits by controlling the first and second selection control signals CON_NR and CON_HG and the clock signals CLK1, CLK2, CLK3, and CLK4 applied to the switching unit 450, which has a relatively simple structure. Further, when coping with various driving methods, additional clock signal wiring may not be required and a driving margin may also be secured.

Figure 11:
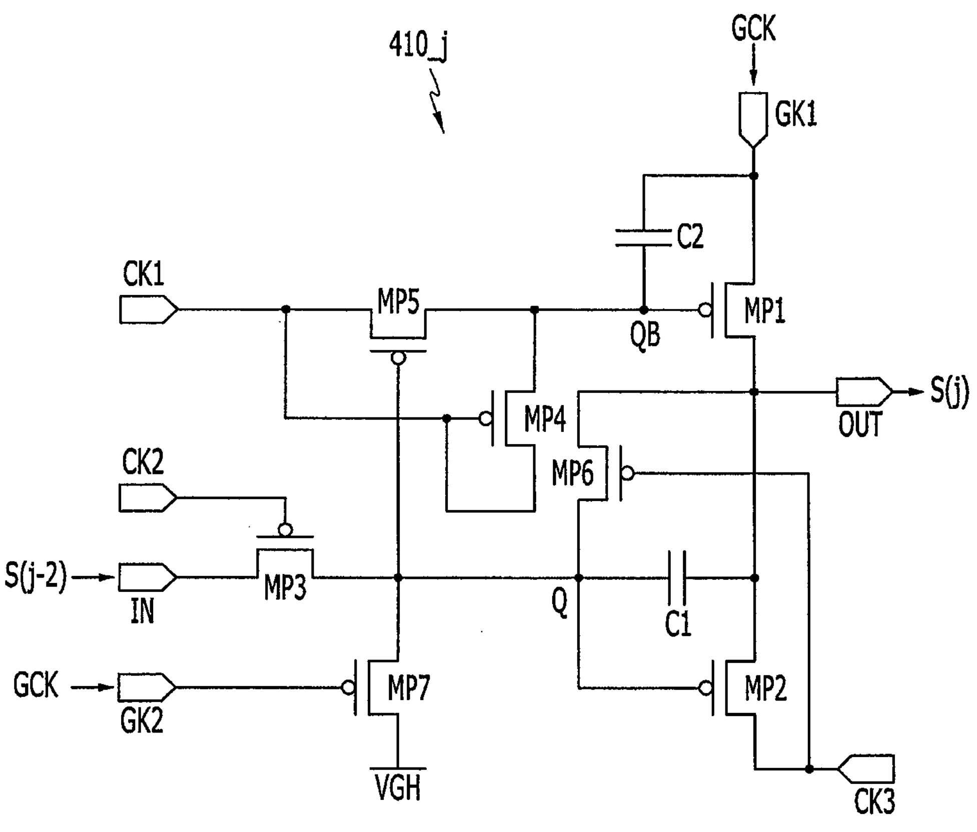
FIG. 11 is an example of a circuit diagram showing one stage of the scan driver according to the example embodiment of the present invention.

Next, the scan driver 400 according to an example embodiment of the present invention will be described with reference to the drawings described above together with FIG. 11. FIG. 11 is an example of a circuit diagram showing one stage of the scan driver according to an example embodiment of the present invention.

Referring to FIG. 11, in each stage of the scan driver 400 according to an example embodiment of the present invention, as an example, the j-th stage **410_*j*** includes the first clock terminal CK1, the second clock terminal CK2, the third clock terminal CK3, the input terminal IN, the output terminal OUT, the plurality of terminals such as the first and second global output control terminals GK1 and GK2, the plurality of transistors MP1, MP2, MP3, MP4, MP5, MP6_1, MP6_2, and MP7, and the plurality of capacitors C1 and C2.

The first and second clock terminals CK1 and CK2 receive the clock signal selected by the first multiplexer 452, and the third clock terminal CK3 receives the clock signal selected by the second multiplexer 454. The output terminal OUT outputs the scan signal S(j), and the input terminal IN receives the scan signal S(j−2) outputted from the output terminal OUT of the second previous stage **410_*j*−2** or the scan start signals SSP_O and SSPE. The first and second global output control terminals GK1 and GK2 receive the global output control signal GCK.

The first transistor MP1 is coupled between the first global output control terminal GK1 and the output terminal OUT, and the gate is coupled to the first node QB. The second transistor MP2 is coupled between the first clock terminal CK3 and the output terminal OUT, and the gate is coupled to the second node Q. The third transistor MP3 is coupled between the input terminal IN and the second node Q, and the gate is coupled to the second clock terminal CK2. The fourth transistor MP4 is coupled between the first clock terminal CK1 and the first node QB, and the gate, together with the drain, is coupled to the first clock terminal CK1. The fifth transistor MP5 is coupled between the first clock terminal CK1 and the first node QB, and the gate is coupled to the second node Q. The sixth transistor MP6 is coupled between the second node Q and the output terminal OUT, and the gate is coupled to the third clock terminal CK3. The seventh transistor MP7 is coupled between the second node Q and the power voltage terminal VGH, and the gate is coupled to the second global output control terminal GK2. The first capacitor C1 is coupled between the second node Q and the output terminal OUT, and the second capacitor C2 is coupled between the first global output control terminal GK1 and the first node QB.

The transistors MP1, MP2, MP3, MP4, MP5, MP6_1, MP6_2, and MP7 may be p-channel field effect transistors (FETs). In this instance, the gate-on voltage for turning on the transistors MP1, MP2, MP3, MP4, MP5, MP6_1, MP6_2, and MP7 may be a low level voltage, and the gate-off voltage for turning on the transistors MP1, MP2, MP3, MP4, MP5, MP6_1, MP6_2, and MP7 may be a high level voltage.

The transistors MP1, MP2, MP3, MP4, MP5, MP6_1, MP6_2, and MP7 are not limited to a p-channel type, however, and may be an n-channel type, and in this instance, the levels of the gate-on and gate-off voltages may be varied (e.g., alternated with respect to the gate-on and gate-off voltages described above with respect to the p-channel FETs).

The various driving methods described above may be applied to the structure of the scan driving circuit according to an example embodiment, and thus the scan driver may be relatively flexibly applicable to the various scan driving methods such as the sequential driving, the half driving, and the concurrent (e.g., simultaneous) driving and various pixel circuits by controlling the first and second selection control signals CON_NR and CON_HG and the clock signals CLK1, CLK2, CLK3, and CLK4, which are applied to the switching unit 450.

While this invention has been described in connection with what is presently considered to be practical example embodiments, it is to be understood that the invention is not limited to the disclosed embodiments, but, on the contrary, is intended to cover various modifications and equivalent arrangements included within the spirit and scope of the appended claims, and their equivalents.

DESCRIPTION OF SYMBOLS

300: display panel
400: scan driver
410: scan driving circuit
450: switching unit
452, 454: multiplexer
500: data driver
600: signal controller.

What is claimed is:

1. A scan driver comprising:

a plurality of stages arranged sequentially and configured to respectively output a scan signal; and a switching unit configured to receive a plurality of clock signals, to select clock signals of the plurality of clock signals according to a selection control signal, and to input the selected clock signals to the plurality of stages, wherein the switching unit comprises, for each of the plurality of stages, first and second multiplexers coupled to a respective stage of the plurality of stages.

2. The scan driver of claim 1, wherein the first and second multiplexers are each configured to receive a first portion and a second portion, respectively, of the plurality of clock signals, to select a clock signal among the plurality of clock signals, and to output the selected clock signal to the respective stage.

3. The scan driver of claim 2, wherein the first portion of the clock signals and second portion of the clock signals are different from each other.

4. The scan driver of claim 3, wherein the first and second multiplexers each comprise a first control transistor and a second control transistor, wherein output terminals of the first and second control transistors are coupled to each other, wherein a control terminal of the first control transistor is configured to receive a first selection control signal, and wherein a control terminal of the second control transistor is configured to receive a second selection control signal.

5. The scan driver of claim 4, wherein:

odd-numbered stages among the plurality of stages, except for a first stage, are configured to receive a scan signal output from a second previous stage, and the first stage is configured to receive a first scan start signal; and even-numbered stages among the plurality of stages, except for a second stage, are configured to receive a scan signal outputted from a second previous stage, and the second stage is configured to receive a second scan start signal.

6. The scan driver of claim 5, wherein the plurality of stages comprises:

a first clock terminal and a second clock terminal configured to receive the selected clock signal output from the first multiplexer;

a third clock terminal configured to receive the clock signal output from the second multiplexer;

an input terminal configured to receive any one among the first scan start signal, the second scan start signal, or the scan signal output from the second previous stage;

a first global output control terminal and a second global output control terminal configured to receive a global output control signal; and an output terminal configured to output the scan signal.

7. The scan driver of claim 6, wherein the plurality of stages comprises:

a first transistor coupled between the first global output control terminal and the output terminal and comprising a gate coupled to a first node;

a second transistor coupled between the third clock terminal and the output terminal and comprising a gate coupled to a second node;

a third transistor coupled between the input terminal and the second node and comprising a gate coupled to the second clock terminal;

a fourth transistor coupled between the first clock terminal and the first node and comprising a gate coupled to the first clock terminal;

a fifth transistor coupled between the first clock terminal and the first node and comprising a gate coupled to the second node;

at least one sixth transistor coupled between the second node and the output terminal; and a seventh transistor coupled between the second node and a power voltage terminal and comprising a gate coupled to the second global output control terminal.

8. The scan driver of claim 7, wherein the at least one sixth transistor comprises a first sixth transistor and a second sixth transistor coupled in series, and a gate of the first sixth transistor is coupled to the third clock terminal, and a gate of the second sixth transistor is coupled to the first node.

9. The scan driver of claim 5, wherein a pulse of the first scan start signal is not synchronized with a pulse of the second scan start signal, wherein levels of the first selection control signal and the second selection control signal are different from each other, and wherein gate-on voltages from the plurality of stages are sequentially output.

10. The scan driver of claim 5, wherein a pulse of the first scan start signal is synchronized with a pulse of the second scan start signal, wherein levels of the first selection control signal and the second selection control signal are different from each other, and wherein each neighboring two stages of the plurality of stages form a group, the stages of each group are configured to output gate-on voltages with a same timing, and the stages of the groups neighboring each other are configured to sequentially output the gate-on voltages.

11. The scan driver of claim 5, wherein the first scan start signal and the second scan start signal respectively maintain a constant voltage level, levels of the first selection control signal and the second selection control signal are equal, and the plurality of stages are configured to output the scan signal having a same waveform as a global output control signal.

12. A driving method of a scan driver, the scan driver comprising a plurality of stages, the driving method comprising:

providing a plurality of clock signals to a switching unit;

selecting, by the switching unit, a first selected clock signal among the plurality of clock signals according to a selection control signal, wherein the switching unit comprises, for each of the plurality of stages, first and second multiplexers coupled to a respective stage of the plurality of stages;

providing the first selected clock signal to the respective stage of the plurality of stages; and outputting, by the respective stage, a scan signal in accordance with the first selected clock signal.

13. The driving method of claim 12, wherein selecting the first selected clock signal further comprises:

providing a first portion of the plurality of clock signals to the first multiplexer and providing a second portion of the plurality of clock signals to the second multiplexer;

selecting the first selected clock signal among the first portion of the plurality of clock signals; and providing the first selected clock signal to the respective stage.

14. The driving method of claim 13, wherein the first portion of the plurality of clock signals provided to the first multiplexer and the second portion of the plurality of clock signals provided to the second multiplexer are different from each other.

15. The driving method of claim 14, wherein the first and second multiplexers each comprise a first control transistor and a second control transistor, and wherein selecting the first selected clock signal further comprises:

turning the first control transistor on or off according to a first selection control signal; and turning the second control transistor on or off according to a second selection control signal.

16. The driving method of claim 15, further comprising:

providing a scan signal from a second previous stage to odd-numbered stages, except for a first stage, among the plurality of stages, and providing a first scan start signal to the first stage; and providing a scan signal from a second previous stage to even numbered stages, except for a second stage, among the plurality of stages, and providing a second scan start signal to the second stage.

17. The driving method of claim 16, wherein the plurality of stages comprises:

a first clock terminal and a second clock terminal configured to receive the first selected clock signal from the first multiplexer;

a third clock terminal configured to receive a second selected clock signal from the second multiplexer;

an input terminal configured to receive any one of the first scan start signal, the second scan start signal, or a scan signal outputted from the second previous stage;

a first global output control terminal and a second global output control terminal configured to receive a global output control signal; and an output terminal configured to output the scan signal.

18. The driving method of claim 16, wherein a pulse of the first scan start signal is not synchronized with a pulse of the second scan start signal, wherein levels of the first selection control signal and the second selection control signal are different from each other, and wherein gate-on voltages from the plurality of stages are sequentially outputted.

19. The driving method of claim 16, wherein a pulse of the first scan start signal is synchronized with a pulse of the second scan start signal, wherein levels of the first selection control signal and the second selection control signal are different from each other, and wherein each neighboring two stages of the plurality of stages form a group, the stages of each group output gate-on voltages with a same timing, and the stages of the groups neighboring each other are configured to sequentially output the gate-on voltages.

20. The driving method of claim 16, wherein the first scan start signal and the second scan start signal respectively maintain a constant voltage level, wherein levels of the first selection control signal and the second selection control signal are equal, and wherein the plurality of stages are configured to output the scan signal having a same waveform as a global output control signal.

* * * * *